April 20, 1943.     R. H. WHISLER, JR     2,316,924
HYDRAULIC SHOCK ABSORBER STRUCTURE
Filed Nov. 12, 1941
FIG.1.
FIG.3.
FIG.2.
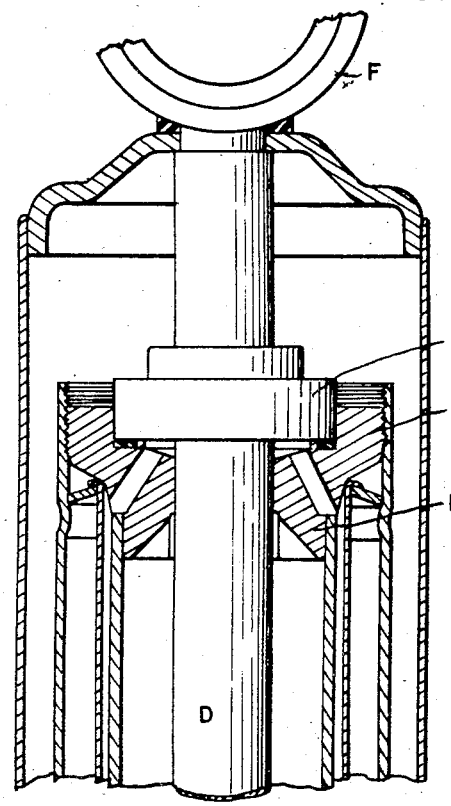
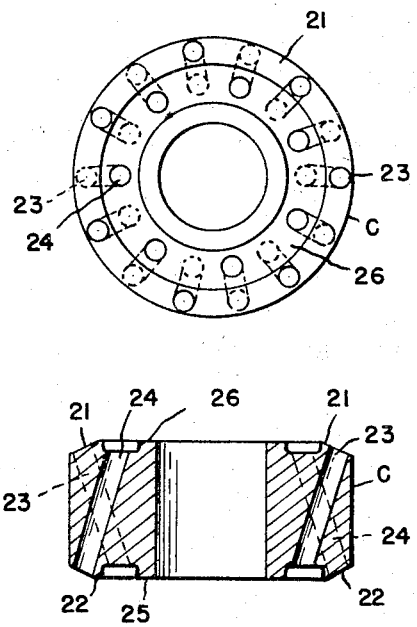
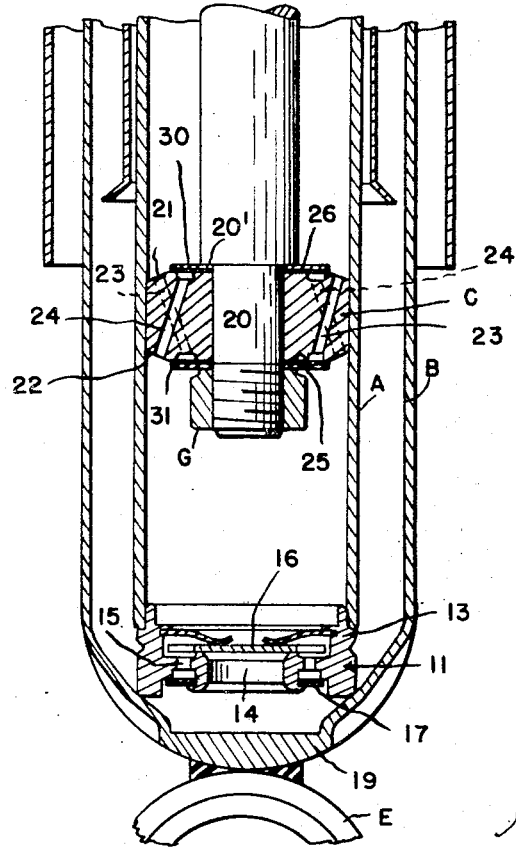
INVENTOR.
RALPH H. WHISLER JR.
BY Whittemore Hulbert & Belknap
ATTORNEYS Patented Apr. 20, 1943

2,316,924

UNITED STATES PATENT OFFICE 2,316,924

HYDRAULIC SHOCK ABSORBER STRUCTURE

Ralph H. Whisler, Jr., Monroe, Mich., assignor to Monroe Auto Equipment Company, Monroe, Mich., a corporation of Michigan Application November 12, 1941, Serial No. 418,791

8 Claims. (Cl. 188—88)

This invention relates generally to hydraulic shock absorbers and refers more particularly to an improved piston and valve assembly for use in a hydraulic shock absorber of the direct acting type.

One of the essential objects of the invention is to provide a piston and valve assembly wherein the passages through the piston, and the valves controlling said passages are constructed and arranged in such a way that sufficient pressure to open the valves for said passages may be built up faster by a shorter stroke of the piston in the pressure cylinder.

Another object is to provide a piston construction wherein the passages for the hydraulic medium are constructed and arranged in such a way that the displacement of hydraulic medium upwardly through the piston on the compression stroke thereof is substantially equal to the full cross sectional area or bore of the pressure cylinder.

Another object is to provide a piston and valve assembly wherein the passages for the hydraulic medium are arranged in such a way in the piston that solid valves may be employed at the top and bottom of the piston to provide the desired resistance to the flow of the hydraulic medium through the piston. In my present invention the piston contains two sets of open ended inclined passages. One set inclines from a large diameter circle on the bottom of the piston to a small diameter circle on the top of the piston. The other set inclines from a large diameter circle on the top of the piston to a small diameter circle on the bottom of the piston. The valves control the open ends of the passages at the small diameter circles at the top and bottom of the piston and thus are inside and clear of the large diameter circles of open ends of said passages at the top and bottom of the piston.

Another object is to provide a piston and valve assembly that is simple in construction, inexpensive to manufacture and efficient in operation.

Other objects, advantages and novel details of construction of this invention will be made more apparent as this description proceeds, especially when considered in connection with the accompanying drawing, wherein:

Figure 1 is a longitudinal sectional view through a shock absorber having a piston structure embodying my invention;

Figure 2 is a sectional view through the piston per se;

Figure 3 is a plan view of the piston illustrated in Figure 2.

Referring now to the drawing, A is the pressure cylinder, B is the reserve chamber, and C is the piston embodying my invention of a hydraulic shock absorber.

As shown, the pressure cylinder A has a closure 10 at its upper end apertured to receive a rod D for the piston C and has a base compression valve assembly 11 at its lower end. The closure 10 carries a suitable seal 12 to prevent leakage of the hydraulic medium along the rod to the exterior of the shock absorber, while the base compression valve assembly 11 has a body 13 rigid with the cylinder A and provided with a relatively large central opening 14 and a series of smaller openings 15 substantially concentric with the central opening, a spring pressed disc valve 16 controlling the central opening 14, and a laminated spring valve 17 controlling the smaller openings 15.

The reserve chamber B is substantially concentric with the pressure cylinder A and is mounted on an annular enlargement 18 of the closure 10. The lower end 19 of the reserve chamber B is closed and is rigid with a circular head E adapted to be attached to the unsprung weight of a vehicle. A similar head F is rigid with the outer end of the rod D and is adapted to be attached to the sprung weight of the vehicle.

The piston C is anchored on a reduced lower end portion 20 of the rod D between a shoulder 20' thereof and a suitable retaining nut G and slidably engages the inner walls of the pressure cylinder A. In the present instance, the piston C comprises a relatively thick annular body provided with beveled or inclined upper and lower edges 21 and 22, respectively, and having two sets of open-ended equally spaced passages 23 and 24, respectively, extending therethrough. The passages 23 incline upwardly from the flat lower face 25 of the piston to the upper beveled edges 21, while the passages 24 cross the passages 23 and incline downwardly from the flat upper face 26 of the piston to the lower beveled edges 22. Thus, the upper ends of the passages 23 are in a large circle concentric with the center of the piston while the lower ends of said passages are in a smaller circle concentric with the center of the piston. The reverse is true of the passages 24. Located between the top of the piston C and the shoulder 20' of the rod D is a laminated spring valve 30 that normally closes the upper ends of the passages 24, while between the underside of the piston and the retaining nut G is a laminated spring valve 31 that normally closes the lower ends of the passages 23.

In use, when the piston C is moving downwardly in the cylinder A on its compression stroke toward the base compression valve assembly 11, hydraulic medium in the lower portion of the cylinder A below said piston will flow upwardly through the passages 24 in the piston past the upper laminated spring valve 30 to the space within the cylinder A above the piston. Likewise, on the compression stroke hydraulic medium will flow downwardly from the lower portion of the cylinder A through the openings 15 in the body 13 of the base compression valve assembly past the laminated spring valve 17 to the reserve chamber B. On the rebound stroke, the piston C will move upwardly in the cylinder A toward the closure 10; hence, hydraulic medium will flow downwardly through the passages 23 in the piston past the laminated spring valve 31 to the space in the cylinder below the piston. Likewise, on the rebound stroke of the piston, hydraulic medium will flow upwardly from the reserve chamber B through the central opening 14 in the body 13 of the compression valve assembly past the disc valve 16 into the compression cylinder A. Thus, it will be apparent that the valves 30 and 31 covering the crossed passages in the piston meter the flow of the hydraulic medium and provide the shock absorber resistance both on compression and rebound. The number and thickness of the laminations of said valves determine such resistance. Rebound resistance is dependent solely on the piston rebound valve 31, while compression resistance is determined by the summation of the resistance provided by the piston compression valve 30 and the base compression valve 17. Moreover, this laminated spring valve 17 must have higher unit pressure than the piston valve 30 to prevent starving the upper part of the pressure cylinder A of the hydraulic medium. As a result of the crossed openings 23 and 24, a full bore displacement is obtained. Thus, it is possible to build up faster in a shorter stroke of the piston sufficient pressure to open the valves 30 and 31.

What I claim as my invention is:

1. In a shock absorber, a pressure cylinder, and a piston slidably engaging the inner walls of the cylinder and having a solid body containing two sets of open-ended passages and having substantially flat top and bottom sides provided with beveled edges, one set of open-ended passages inclining upwardly from the flat lower side to the beveled upper edges of said body, and the other set of open-ended passages crossing the first mentioned set of passages and inclining downwardly from the flat upper side to the beveled lower edges of said body.

2. In a shock absorber, a pressure cylinder, and a piston slidably engaging the inner walls of the cylinder and having two sets of open-ended passages and substantially flat top and bottom sides provided with beveled edges, one set of passages extending from the flat bottom side to the upper beveled edge of the piston, the second set of passages extending from the flat top side to the lower beveled edge of the piston, and laminated spring valves respectively on the flat top and bottom sides of the piston, the valve on the top side of the piston controlling the upper open ends of one set of passages, the valve on the bottom side of the piston controlling the lower open ends of the other set of passages.

3. In a shock absorber, a pressure cylinder, and a piston slidably engaging the inner walls of said cylinder and comprising a solid body containing two sets of open-ended passages, each set inclining from a large diameter circle on one side to a smaller diameter circle on the other side of said body.

4. In a shock absorber, a pressure cylinder, and a piston slidably engaging the inner walls of said cylinder and comprising a solid body containing two sets of open-ended passages, each set inclining from a large diameter circle on one side to a smaller diameter circle on the other side of said body, and valves upon the sides mentioned of the body controlling the open ends of the passages at the small diameter circles, the open ends of the passages at the large diameter circles being outside and always free of said valves.

5. In a shock absorber, a pressure cylinder, and a piston slidably engaging the inner walls of said cylinder and comprising a solid body containing two sets of open-ended passages, one set inclining from a large diameter circle at the bottom to a smaller diameter circle at the top of said body, the other set inclining from a small diameter circle at the bottom to a larger diameter circle at the top of said body, and solid valves clamped against the top and bottom of the body and controlling the open ends of the passages in the smaller diameter circles, the open ends of the passages in the larger diameter circles being outside and free of said valves.

6. In a shock absorber, a pressure cylinder, and a piston slidably engaging the inner walls of the cylinder and comprising a solid body having crossed diagonally extending passages opening through both the top and bottom sides thereof, the openings provided by said passages in the top and bottom sides of said body being in inner and outer substantially concentric circles, and solid valves clamped against said top and bottom sides of the body and normally closing the openings in the inner circles, the openings in the outer circles being outside and free of said valves.

7. In a shock absorber, a pressure cylinder, and a piston slidably engaging the inner walls of the cylinder and having two sets of open-ended passages, one set crossing the other, the open ends of said crossed passages being in circles of different diameter at the top and bottom sides of the piston, and solid valves on the top and bottom sides of said piston normally closing the ends of the passages in the circles of smallest diameter and being inside and free of the ends of the passages in the circles of greatest diameter.

8. In a shock absorber, a pressure cylinder, and a solid piston within and slidably engaging said cylinder, said piston containing two sets of open ended inclined passages, one set inclining from a large diameter circle on the bottom of the piston to a small diameter circle on the top of the piston, the other set inclining from a large diameter circle on the top of the piston to a small diameter circle on the bottom of the piston, and disc valves clamped against the top and bottom of said piston at the center thereof and normally closing the open ends of the passages at the small diameter circles on the top and bottom of the piston, said disc valves being wholly inside and clear of the large diameter circles of open ends of said passages at the top and bottom of said piston.

RALPH H. WHISLER, Jr.